(12) United States Patent
Belenky et al.

(10) Patent No.: US 9,031,227 B2
(45) Date of Patent: May 12, 2015

(54) PATTERN-FREE ENCRYPTION

(75) Inventors: Yaacov Belenky, Maaleh Adumim (IL); Chaim D. Shen-Orr, Haifa (IL)

(73) Assignee: Cisco Technology Inc., San Jose, CA (US)

( * ) Notice: Subject to any disclaimer, the term of this patent is extended or adjusted under 35 U.S.C. 154(b) by 145 days.

(21) Appl. No.: 13/380,965

(22) PCT Filed: Dec. 28, 2009

(86) PCT No.: PCT/IB2009/055963
§ 371 (c)(1),
(2), (4) Date: Feb. 7, 2012

(87) PCT Pub. No.: WO2011/001230
PCT Pub. Date: Jan. 6, 2011

(65) Prior Publication Data
US 2012/0128150 A1 May 24, 2012

(30) Foreign Application Priority Data
Jun. 28, 2009 (IL) .......................................... 199616

(51) Int. Cl.
*H04L 29/06* (2006.01)
*H04L 9/06* (2006.01)
*H04N 21/2347* (2011.01)

(52) U.S. Cl.
CPC ........ *H04L 9/0637* (2013.01); *H04N 21/23476* (2013.01); *H04L 2209/30* (2013.01); *H04L 2209/601* (2013.01); *H04L 9/065* (2013.01)

(58) Field of Classification Search
CPC H04N 21/23476; H04L 9/065; H04L 9/0637; H04L 2209/601; H04L 2209/30
USPC .............. 726/1–25; 380/1–255; 713/150–181
See application file for complete search history.

(56) References Cited

U.S. PATENT DOCUMENTS 5,835,599 A * 11/1998 Buer ................................ 380/29
7,151,833 B2 12/2006 Candelore et al.
(Continued)

FOREIGN PATENT DOCUMENTS

| EP | 1 503 590 A2 | 2/2005 |
|---|---|---|
| GB | 2 382 753 A | 6/2003 |

(Continued)

OTHER PUBLICATIONS

International Search Report and Written Opinion, dated May 7, 2010, in International Application No. PCT/IB2009/055963, filed Dec. 28, 2009, 18 pages.
(Continued)

*Primary Examiner* — Taghi Arani
*Assistant Examiner* — Don Zhao
(74) *Attorney, Agent, or Firm* — Husch Blackwell LLP (57) ABSTRACT

A method is described for defining a reserved pattern of symbols, receiving in a crypto-module an input stream including sequential input symbols, applying a cipher to the input stream in the crypto-module so as to generate an intermediate stream including sequential output symbols corresponding respectively to the input symbols, and converting the intermediate stream to an output stream from the crypto-module by comparing successive groups of the input symbols and the corresponding output symbols to the reserved pattern and, upon finding a match to the reserved pattern in a given group, substituting the input symbols in the group into the intermediate stream in place of the corresponding output symbols. Related hardware and systems are also described.

22 Claims, 3 Drawing Sheets

(56) References Cited

U.S. PATENT DOCUMENTS

| | | |
|---|---|---|
| 2001/0033660 A1 | 10/2001 | Maeda |
| 2003/0037027 A1* | 2/2003 | Linhart .................... 707/1 |
| 2004/0258089 A1* | 12/2004 | Derechin et al. ............ 370/465 |
| 2005/0216752 A1* | 9/2005 | Hofmeyr et al. ............ 713/189 |
| 2005/0286720 A1* | 12/2005 | Fukuoka et al. ............ 380/255 |
| 2006/0222178 A1 | 10/2006 | Kuwabara et al. |
| 2007/0011734 A1* | 1/2007 | Balakrishnan et al. ......... 726/13 |
| 2007/0116267 A1* | 5/2007 | Speirs et al. .................... 380/28 |
| 2007/0143784 A1* | 6/2007 | Kubota et al. .................... 725/31 |
| 2008/0253561 A1* | 10/2008 | Minematsu .................... 380/29 |
| 2009/0180133 A1* | 7/2009 | Yamamoto .................. 358/1.13 |
| 2009/0259612 A1* | 10/2009 | Hanson .......................... 706/47 |

FOREIGN PATENT DOCUMENTS

| | | |
|---|---|---|
| GB | 2 430 510 A | 3/2007 |
| WO | WO 2006/117775 A2 | 11/2006 |
| WO | WO 2008/084966 A1 | 7/2008 |

OTHER PUBLICATIONS

Oct. 2, 2012 Office Communication in connection with prosecution of EP 09 801 791.6.

Nov. 14, 2012 Office Communication in connection with prosecution of IL 199616.

A. Menezes et al., Handbook of Applied Cryptography, pp. 223 and 226-231 (CRC Press, 1996).

* cited by examiner

PATTERN-FREE ENCRYPTION

CROSS REFERENCE TO RELATED APPLICATIONS

The present application is a 35 USC §371 application of PCT/IB2009/055963, filed on Dec. 28, 2009 and entitled "PATTERN-FREE ENCRYPTION", which was published in the English language with International Publication Number WO 2011/001230 A1, and which claims the priority of Israeli Patent Application No. IL 199616 of NDS Limited, filed Jun. 28, 2009, the content of all of which is incorporated herein by reference.

FIELD OF THE INVENTION

The present invention relates generally to data encryption, and specifically to techniques for controlling the output of a cipher.

BACKGROUND OF THE INVENTION

The process of encryption converts ordinary information (referred to as "plaintext") into unintelligible "ciphertext." Decryption is the reverse process, converting ciphertext back to plaintext. Various algorithms—known as "ciphers"—are used for encryption and the reverse decryption process. The cipher uses a secret parameter, known as a "key," in carrying out the encryption and decryption processes.

Various types of ciphers are known in the art. For example, a stream cipher is a symmetric-key cipher in which plaintext bits are combined with a stream of pseudorandom cipher bits (referred to as a "keystream"), most commonly by an exclusive-or (XOR) operation. The plaintext symbols are typically encrypted one at a time, and the transformation of successive symbols varies during the encryption.

A block cipher operates on data blocks of fixed length, such as 64 or 128 bits. There are certain standard ways, however, to build a stream cipher based on an arbitrary block cipher. For example, output feedback (OFB) mode encryption uses an encryption function E to generate a sequence of keystream blocks $O_i$, each based on the encryption key and on the preceding keystream block. The successive keystream blocks are XORed with the successive plaintext blocks $P_i$ to give the ciphertext blocks $C_i$. Because of the symmetry of the XOR operation, encryption and decryption are exactly the same:

$$C_i = P_i \oplus O_i$$

$$P_i = C_i \oplus O_i$$

$$O_i = E_K(O_{i-1})$$

$$O_0 = IV \qquad (1)$$

(IV is an initialization vector, which is used to generate the first keystream block, and K is a key.)

As another example, in cipher feedback (CFB) mode, each keystream block is based on the encryption key and on the preceding ciphertext block:

$$C_i = E(C_{i-1}) \oplus P_i$$

$$P_i = E(C_{i-1}) \oplus C_i$$

$$C_0 = IV \qquad (2)$$

(Since the ciphertext $C_i$ is determined by the plaintext $P_i$, the encryption function at any point may equivalently be framed as a function of the preceding plaintext blocks.) In this case, decryption is similar, but not identical, to the encryption operation.

In some applications, only part of a plaintext stream is encrypted, while other parts are transmitted in the clear. For example, U.S. Pat. No. 7,151,833, whose disclosure is incorporated herein by reference, describes a method of selectively encrypting and decoding digital video content. Certain packets are selected for encryption according to a selection criterion, wherein the selected packets exclude packets containing start of frame (SOF) headers. The selected packets are encrypted while retaining the packets containing the SOF headers unencrypted. In decoding the selectively-encrypted digital video content, offsets are calculated for at least one of the I frames and P frames from the SOF headers, and the calculated offsets are stored as an offset table. The offset table can then be accessed to enable trick play of the selectively-encrypted digital video content.

SUMMARY OF THE INVENTION

Common modes of encryption generate ciphertext that may comprise any arbitrary sequence of symbols. In some applications, however, a certain word or words (i.e., patterns of symbols) may be reserved, and it is desirable that these reserved words not appear in the ciphertext.

There is therefore provided, in accordance with an embodiment of the present invention, a method for data encryption, including defining a reserved pattern of symbols and receiving in a crypto-module an input stream including sequential input symbols. A cipher is applied to the input stream in the crypto-module so as to generate an intermediate stream including sequential output symbols corresponding respectively to the input symbols. The intermediate stream is converted to an output stream from the crypto-module by comparing successive groups of the input symbols and the corresponding output symbols to the reserved pattern and, upon finding a match to the reserved pattern in a given group, substituting the input symbols in the group into the intermediate stream in place of the corresponding output symbols.

In a disclosed embodiment, the method includes transmitting the output stream as a sequence of data records including respective headers and payloads, wherein the pattern is indicative of the headers, and applying the cipher includes encrypting the payloads, while the headers are unencrypted.

In one embodiment, comparing the successive groups includes comparing each symbol in the reserved pattern to a corresponding input symbol and a corresponding output symbol in each given group, and finding the match when each of the symbols in the reserved pattern matches at least one of the corresponding input symbol and the corresponding output symbol.

Applying the cipher may include applying an output feedback (OFB) mode encryption or a cipher feedback (CFB) mode encryption to the input stream. When the reserved pattern includes N symbols, the CFB mode encryption uses a feedback loop including a delay no less than N symbols in generating the cipher.

There is also provided, in accordance with an embodiment of the present invention, apparatus for data processing, including an encryption module, which is configured to apply a cipher to an input stream including sequential input symbols so as to generate an intermediate stream including sequential output symbols corresponding respectively to the input symbols. A matching module is configured to convert the intermediate stream to an output stream by comparing successive groups of the input symbols and the corresponding output symbols to a reserved pattern of symbols and, upon finding a match to the reserved pattern in a given group, substituting the input symbols in the group into the intermediate stream in place of the corresponding output symbols.

There is additionally provided, in accordance with an embodiment of the present invention, a computer software product, including a computer-readable medium in which program instructions are stored, which instructions, when read by a computer, cause the computer to receive an input stream including sequential input symbols, to apply a cipher to the input stream so as to generate an intermediate stream including sequential output symbols corresponding respectively to the input symbols, and to convert the intermediate stream to an output stream by comparing successive groups of the input symbols and the corresponding output symbols to a reserved pattern of symbols and, upon finding a match to the reserved pattern in a given group, substituting the input symbols in the group into the intermediate stream in place of the corresponding output symbols.

There is further provided, in accordance with an embodiment of the present invention, a system for data communication, including a server including a crypto-module, which includes an encryption module, which is configured to apply a cipher to an input stream including sequential input symbols so as to generate an intermediate stream including sequential output symbols corresponding respectively to the input symbols. A matching module is configured to convert the intermediate stream to an encrypted output stream by comparing successive groups of the input symbols and the corresponding output symbols to a reserved pattern of symbols and, upon finding a match to the reserved pattern in a given group, substituting the input symbols in the group into the intermediate stream in place of the corresponding output symbols. A transmitter is coupled to transmit the encrypted output stream over a network to a client.

There is moreover provided, in accordance with an embodiment of the present invention, a system for data communication, including a receiver, which is coupled to receive from a network an encrypted input stream including sequential input symbols. A client device includes a crypto-module, which includes an encryption module, which is configured to apply a cipher to the input stream so as to generate an intermediate stream including sequential output symbols corresponding respectively to the input symbols. A matching module is configured to convert the intermediate stream to a decrypted output stream by comparing successive groups of the input symbols and the corresponding output symbols to a reserved pattern of symbols and, upon finding a match to the reserved pattern in a given group, substituting the input symbols in the group into the intermediate stream in place of the corresponding output symbols.

There is furthermore provided, in accordance with an embodiment of the present invention, a method for data encryption, which includes defining a reserved pattern of symbols and receiving in a crypto-module an input stream comprising sequential input symbols. A cipher and interleaving procedure is applied to the input stream in the crypto-module so as to generate an output stream including a sequence of ciphered symbols interleaved with one of the input symbols at each location in the sequence that corresponds to an occurrence of the reserved pattern.

In disclosed embodiments, the output stream contains a number of output symbols, including the ciphered symbols and the interleaved input symbols, that is equal to the number of the input symbols in the input stream.

The present invention will be more fully understood from the following detailed description of the embodiments thereof, taken together with the drawings in which:

DETAILED DESCRIPTION OF EMBODIMENTS

Overview

In some video streaming formats, such as Motion Picture Experts Group (MPEG) compression and transmission formats, the clear (unencrypted) stream comprises records of variable length. These records start from "start codes" that are guaranteed not to appear in any position in the stream other than the record headers. For example, in MPEG2 and MPEG4, the start codes are 32-bit sequences, starting from a 24-bit "prefix" pattern "000000000000000000000001" that never appears in the payload. It is thus possible to distinguish a record header in both forward and backward search through the MPEG stream.

When the stream is encrypted, it is desirable to leave the record headers in the clear, in order to preserve the capability of performing a search in the stream without decrypting it. With current methods of encryption, however, it may happen that encrypting an arbitrary stream bit pattern with an arbitrary key will cause the encrypted payload to contain what looks like a start code. It may thus become impossible to distinguish in the encrypted stream between a record header and a part of the encrypted payload that accidentally includes a start code.

Embodiments of the present invention that are described hereinbelow provide methods and systems for encryption of a stream of symbols in which certain plaintext patterns (referred to herein as "reserved patterns") are preserved in the ciphertext. At the same time, the disclosed methods guarantee that the ciphertext will not contain any spurious appearances of the reserved patterns resulting from encryption of arbitrary plaintext (not containing any of the reserved patterns), regardless of the key that is used. These methods are able to encode all possible n-bit plaintext sequences into pattern-free sequences of the same length, so that the length of the encrypted stream is exactly equal to the length of the clear stream. This feature is important because otherwise, extra information must be supplied in order to enable locating the reserved patterns in the encrypted stream.

In the embodiments that are described hereinbelow, an encryption module (referred to herein simply as an "encryptor") selects certain symbols of plaintext input that are not to be encrypted, i.e., they are passed through to the output ciphertext without modification by the keystream. The selection is based on the predefined reserved pattern or patterns. The encryptor applies a cipher and interleaving procedure to the input stream so as to generate an output stream in which the sequence of ciphered symbols is interleaved with one of the input symbols at each location in the sequence that corresponds to an occurrence of the reserved pattern.

In some embodiments, the encryptor applies a cipher to the input stream so as to generate an intermediate stream comprising a sequence of output symbols, each corresponding respectively to one of the input symbols. The encryptor then compares successive groups of the input symbols and the corresponding output symbols to each reserved pattern. Upon finding a match to a reserved pattern in a given group of the input and output symbols, the encryptor substitutes the input symbols in the group into the intermediate stream in place of the corresponding output symbols.

These substitutions convert the intermediate stream into an output ciphertext stream in which a given reserved pattern will appear only at locations at which it occurred in the input plaintext. If the plaintext does not contain the reserved pattern (for example, when encrypting only the payloads, and not the headers, in a MPEG stream), then the ciphertext will not contain the pattern either. Decryption operates in a symmetrical, or nearly symmetrical, manner to encryption, depending on the choice of cipher.

A number of specific implementation examples are presented below, showing how common types of stream ciphers may be modified to handle reserved patterns in this fashion. The principles of the present invention, however, may similarly be applied to stream ciphers of substantially any other type, including block ciphers that have been converted to stream ciphers. (Methods for performing such conversions are known in the art.)

For convenience and clarity, the encryptors and decryptors in the examples presented below are described as operating on single-bit symbols, but they may similarly operate on substantially any sort of symbol alphabet.

As will be seen in the examples below, decryptors that decrypt symbol streams in accordance with embodiments of the present invention are very similar, or even identical, in structure and operation to the corresponding encryptors that create such symbol streams. Therefore, the term "cryptomodule" is used in the present patent application and in the claims to refer collectively to such encryptors and decryptors and should be understood as embracing both encryptors and decryptors within its scope.

System Description

Figure 1:
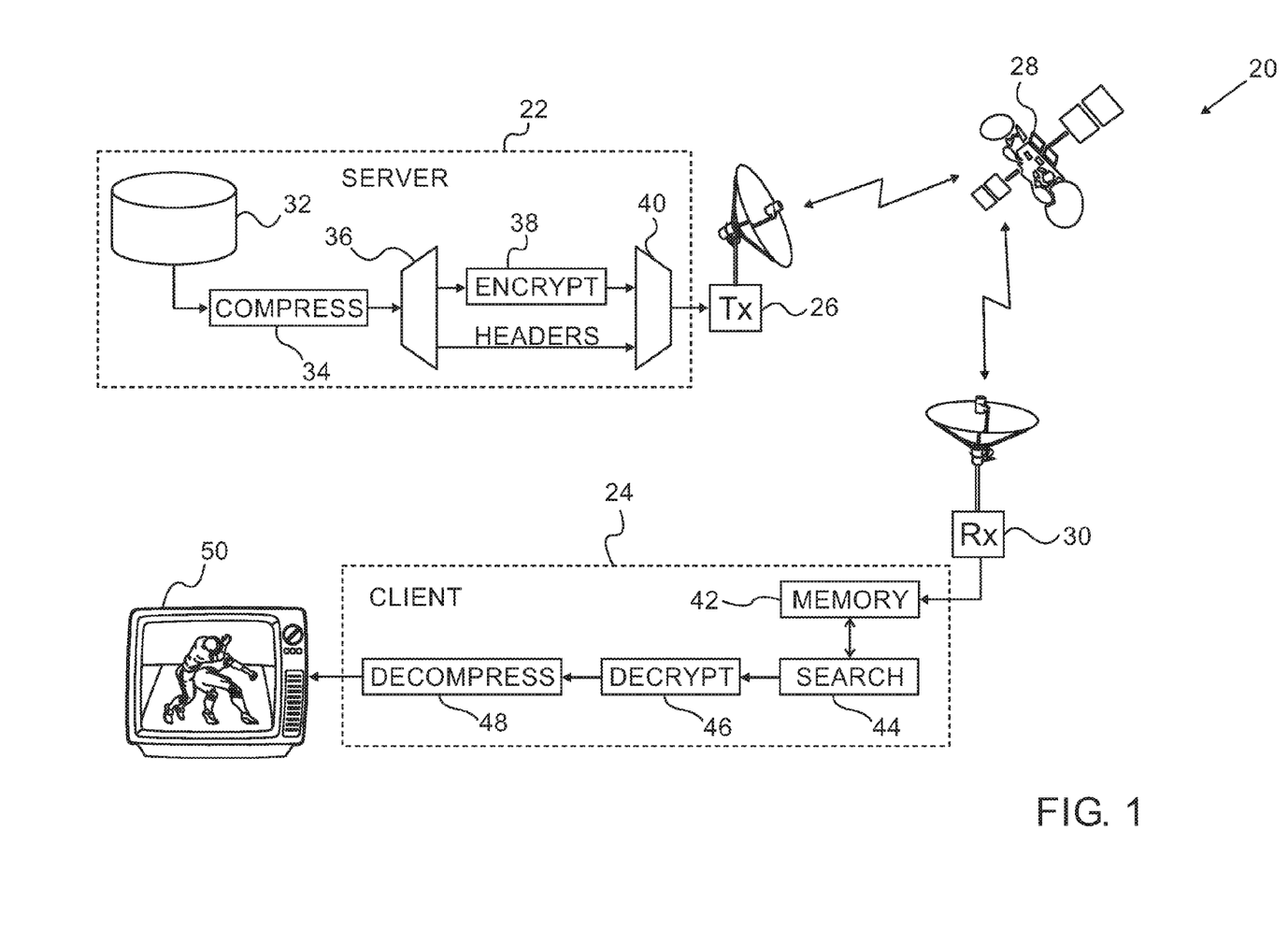
FIG. 1 is a block diagram that schematically illustrates a system for encrypted communications, in accordance with an embodiment of the present invention.

FIG. 1 is a block diagram that schematically illustrates a system 20 for encrypted communications, in accordance with an embodiment of the present invention. This system is shown here as an example of an application in which the principles of the present invention may be applied. The encryption and decryption techniques that are described hereinbelow, however, are in no way limited to the context of this illustrative embodiment, and may be applied in substantially any setting in which encryption is used, whether or not associated with communications.

In system 20, a server 22 transmits encrypted data to a client 24. In this example, the data are assumed to comprise MPEG video broadcast media, which are transmitted over a wireless link between a transmitter 26, a satellite 28, and a receiver 30. Alternatively, server 22 and client 24 may communicate over networks of other types, including both wireless networks and terrestrial networks, such as a cable television network or the Internet, with appropriate changes to the transmitter and receiver, as will be apparent to those skilled in the art. In the pictured embodiment, server may be operated by a video broadcast distributor, while client 24 comprises a television set-top box or other receiving device. The video broadcast distributor transmits the media in encrypted form to ensure that only legitimate clients can decrypt and play the content. To enable efficient seeking (such as fast forward and reverse) through the media, the MPEG prefix bit pattern, 00000000000000000000001, is reserved in server 22, which encrypts the MPEG stream in such a way that the pattern appears only in the record headers of the transmitted stream, and not in the payloads.

Server 22 comprises or is coupled to a media repository 32, which contains digital media content. A compression module 34 compresses the digital media data and encapsulates the compressed data in records of a suitable transport stream, such as MPEG 2 or MPEG 4 packets. Alternatively, server 22 may receive the transport stream already in compressed and encapsulated form.

A demultiplexer 36 separates the MPEG record headers from the payloads. In this example, it is assumed that the headers are transmitted without encryption, in order to enable client 24 to read the headers without prior decryption. For this purpose, the demultiplexer finds occurrences of the prefix in the input stream, and then extracts the prefix and the complete record header that follows it, in accordance with the applicable standard. Alternatively, the headers may be encrypted, as well. The record payloads are encrypted by an encryptor 38, which is described in greater detail hereinbelow. The encryptor is designed so that as long as the reserved pattern does not appear in the plaintext payloads, it will be guaranteed not to appear in the ciphertext output, as well. A multiplexer 40 recombines the headers with the appropriate encrypted payloads for transmission over the satellite link.

Optionally, the encryption function E that is applied to each record may depend on the record header (or on a certain part of the header). If the transport format permits, the record header may include a random field, in order to ensure that E changes from record to record. Changing the encryption function in this manner helps to protect against malicious decryption, particularly when OFB mode is used.

Client 24 receives the encrypted transport stream into a buffer memory 42. A search module 44 enables the client, typically under user control, to search forward or back through the content in the memory by detecting the prefixes and then reading the associated records. A decryptor 46 decrypts the encrypted payloads (while leaving the plaintext headers untouched), as described in detail hereinbelow. A decompression module 48 converts the compressed records into an uncompressed video stream, which may then be output to a display 50.

For efficient processing, encryptor 38 and decryptor 46 typically comprise dedicated hardware logic circuits, in the form of an application-specific integrated circuit (ASIC), field programmable gate array (FPGA), or full-custom integrated circuit, or a combination of such devices. Alternatively or additionally, some or all of the functions of the encryptor and decryptor may be carried out by a programmable processor, such as a microprocessor or digital signal processor (DSP), under the control of suitable software. This software may be downloaded to the processor in electronic form, over a network, for example. Alternatively or additionally, the software may be stored on tangible storage media, such as optical, magnetic, or electronic memory media. Demultiplexer 36 and multiplexer 40 may similarly be implemented in either hardware or software or a combination of hardware and software components. The remaining components of system 20 are standard elements, whose construction will be apparent to those skilled in the art.

OFB Mode Encryption with Reserved Patterns

Figure 2:
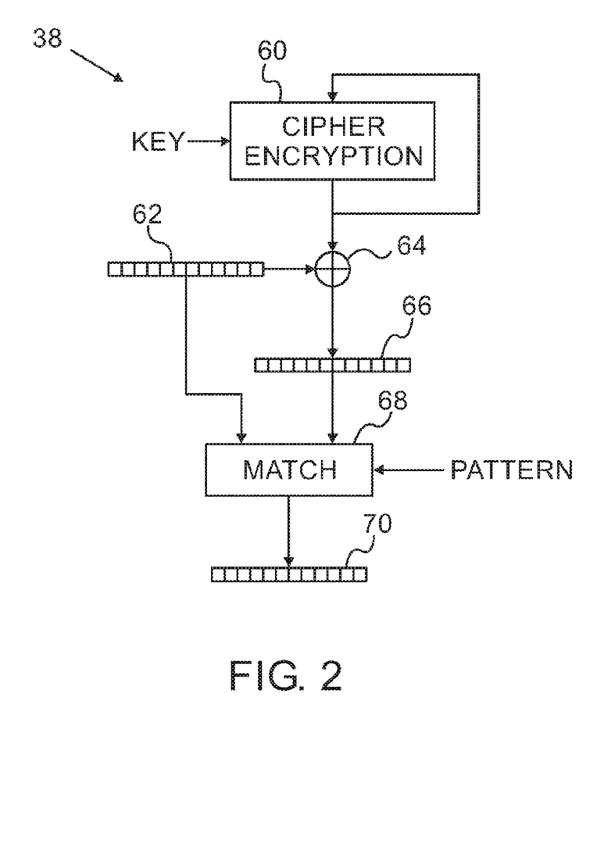
FIG. 2 is a block diagram that schematically illustrates an encryptor, in accordance with an embodiment of the present invention.

FIG. 2 is a block diagram that schematically shows details of encryptor 38, in accordance with an embodiment of the present invention. In this embodiment, the encryptor uses a form of OFB mode encryption (as defined in equations (1) above), which is modified so as to eliminate spurious occurrences of a reserved pattern, or patterns, in the output stream. Decryptor 46 in this case has the same form and mode of operation as encryptor 38.

A cipher encryption module 60 computes the encryption function E, as defined above. E may comprise any suitable function known in the art, such as the well-known functions of the Advanced Encryption Standard (AES) or Data Encryption Standard (DES). (Alternatively, the encryption function may be a native stream cipher, not based on any block cipher, such as the RC4 stream cipher, without any feedback.) In the present embodiment, the successive keystream bits $o_i$ generated by module 60 are combined with the input bits $p_i$ of an input stream 62 by a XOR operation 64, to generate an intermediate stream 66 of output bits $s_i$. (Alternatively, other types of encryption operations, not limited to XOR, may be applied to the input symbols, which are not necessarily bits. It is useful that the encryption operation be self-inverse in order to enable symmetrical encryption and decryption, but any invertible operation may be used.)

A matching module 68 compares successive groups of input bits $p_i$ and the corresponding output bits $s_i$ to the reserved pattern, and generates an output stream 70 of bits $c_i$. If the reserved pattern is n bits long, then the groups of input and output bits compared by module 68 will likewise be n bits long, in a sliding window over the input and intermediate streams. Ordinarily, as long as there is no match to the reserved pattern, module 68 passes output bits $s_i$ to the output stream, i.e., $c_i = s_i$. If either the input bit $p_i$ or the output bit $s_i$ (or both) at each bit position within the window matches the bit in the reserved pattern, for all bits within a given window, however, then module 68 substitutes the input bits for the output bits in that window in output stream 70, i.e., $c_i = p_i$. In this manner, it is guaranteed that the reserved pattern will not appear in the output stream except where it appears in the input stream.

In more formal terms, encryption of a given plaintext $p_1 p_2 \ldots p_L$ will yield a sequence of pairs of symbols $\{p_1, s_1\}$, $\{p_2, s_2\}, \ldots, \{p_L, s_L\}$, wherein $s_i = o_i \oplus p_i$. A given reserved pattern $v_1 v_2 \ldots v_n$ matches a subsequence of the sequence of pairs $\{p_{k+1}, s_{k+1}\} \{P_{k+2}, S_{k+2}\} \ldots, \{p_{k+n}, s_{k+n}\}$ if for any i between 1 and n either $v_i = p_{k+i}$ or $v_i = s_{k+i}$. The algorithm carried out by encryptor 38 may then be expressed in the following form:

TABLE I

OFB MODE WITH RESERVED PATTERNS

```
For i=1..L
{
    c_i = s_i = o_i ⊕ p_i
    For each pattern v_1v_2...v_n ∈ T
        If n ≤ i
            If v_1v_2...v_n matches {p_{i−n+1}, s_{i−n+1}},
                {p_{i−n+2}, s_{i−n+2}},...,{p_i, s_i}
                For j = i−n+1..i
                    c_j = p_j
}
Output c_1c_2...c_L
```

If the plaintext contains no reserved patterns, then the ciphertext produced by this algorithm will not contain any reserved patterns either. As noted above, the decryption algorithm in this example is identical to the encryption algorithm.

CFB Mode Encryption with Reserved Patterns

Figure 3:
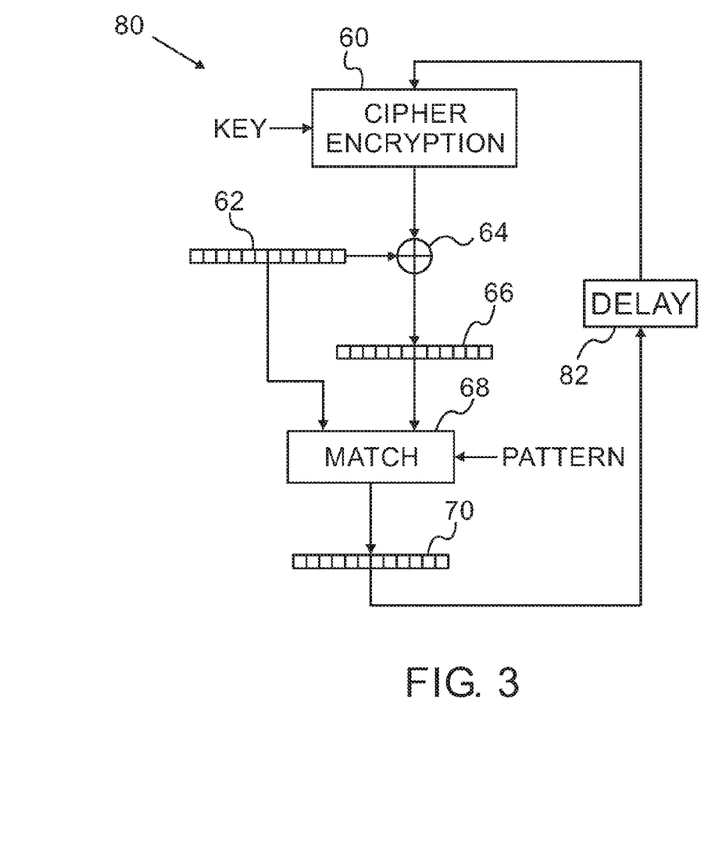
FIG. 3 is a block diagram that schematically illustrates an encryptor, in accordance with another embodiment of the present invention.

FIG. 3 is a block diagram that schematically shows details of an encryptor 80, in accordance with another embodiment of the present invention. In this case, the encryptor implements a modified version of the CFB algorithm, as defined above by equations (2). Encryptor 80 may be substituted for encryptor 38 in system 20 (FIG. 1). The functional blocks of encryptor 80 may be the same as those in encryptor 38, although the feedback connection between the blocks is different. Therefore, for convenience and clarity, the elements of encryptor 80 are labeled with the same numbers as the corresponding elements in encryptor 38 (FIG. 2). Matching module 68 in encryptor 80 carries out the same function as described above.

The encryption algorithm carried out by encryptor 80 is also the same as that shown in Table I, except that in CFB mode, the keystream bits $o_i$ are computed using feedback from output stream 70, rather than the previous keystream values as in OFB mode. The feedback path from output stream 70 to cipher encryption module 60 contains a delay 82 that is at least as long as the longest reserved pattern used by matching module 68. The reason for the delay is to ensure that any substitution of plaintext bits $p_i$ for intermediate bits $s_i$ into the output stream bits $c_i$ is completed before those output stream bits are fed back into module 60.

Figure 4:
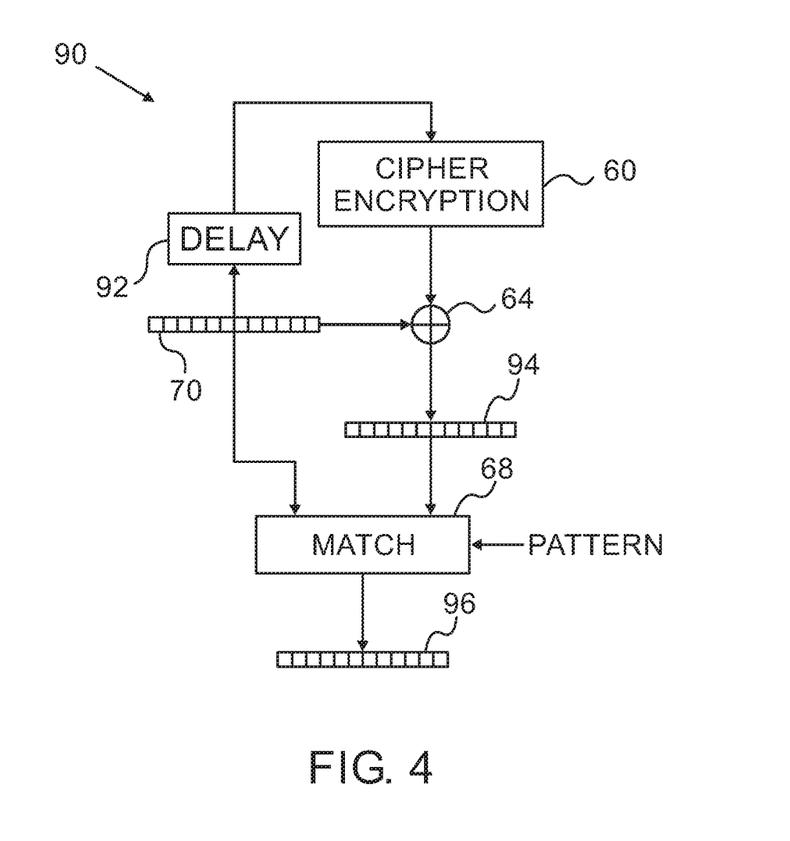
FIG. 4 is a block diagram that schematically illustrates a decryptor, in accordance with an embodiment of the present invention.

FIG. 4 is a block diagram that schematically shows details of a CFB mode decryptor 90, in accordance with an embodiment of the present invention. When encryptor 80 (FIG. 3) is used in server 22, decryptor 90 may be used in place of decryptor 46 (FIG. 1) in client 24. Output stream 70 of encryptor 80 is the input stream to decryptor 90. Cipher encryption module 60 implements the same encryption function E as the corresponding module in encryptor 80, but with input from stream 70, via a delay 92, equal in duration to delay 82. The keystream bits generated by module 60 are combined with the ciphertext bits $c_i$ from stream 70 by XOR operation 64, to generate an intermediate stream 94 of decrypted bits $s_i$. Matching module 68 compares successive groups of bits $c_i$ and the corresponding bits $s_i$ to the reserved pattern, and generates the final plaintext stream 96 of bits $p_i$.

The algorithms carried out by encryptor 80 and decryptor 90 may be expressed formally as follows, wherein N is the length of the longest reserved pattern checked by the matching module:

TABLE II

CFB MODE ENCRYPTION WITH RESERVED PATTERNS

```
For i=1..L
{
    c_i = s_i = E(i, c_0...c_{i−N}) ⊕ p_i
    For each pattern v_1v_2...v_n ∈ T
        If n ≤ i
            If v_1v_2...v_n matches {p_{i−n+1}, s_{i−n+1}},
                {p_{i−n+2}, s_{i−n+2}},...,{p_i, s_i}
                For j=i−n+1..i
                    c_j = p_j
}
Output c_1c_2...c_L
```

TABLE III

CFB MODE DECRYPTION WITH RESERVED PATTERNS

For i=1..L
{
    $p_i = s_i = E(i, c_0...c_{i-N}) \oplus c_i$
    For each pattern $v_1 v_2 ... v_n \in T$
        If n≤i
            If $v_1 v_2 ... v_n$ matches $\{c_{i-n+1}, s_{i-n+1}\}$,
                $\{c_{i-n+2}, s_{i-n+2}\},...,\{c_i, s_i\}$
                For j =i−n+1..i
                      $p_j = c_j$
}
Output $p_1 p_2 ... p_L$ Although the specific embodiments shown in the figures above generate and operate on an intermediate stream, other implementations of the algorithms presented in the tables may, for example, carry out the operations of ciphering and interleaving the input symbols in the output stream in a single stage, without an explicit intermediate stream. Such alternative implementations are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data encryption, comprising:
defining a reserved pattern of symbols having a given length;
receiving in a crypto-module an input stream comprising sequential input symbols;
generating an intermediate stream of intermediate sequential symbols by applying a cypher to the input stream in the crypto-module, wherein each sequential symbol of the intermediate stream corresponds respectively to one of the sequential input symbols;
comparing the reserved pattern to the sequential input symbols and intermediate sequential symbols in a sliding window of the given length in both the input and intermediate streams, wherein the reserved pattern is matched in the sliding window if for each of the symbols of the reserved pattern there is a match with a corresponding sequential symbol in at least one of the input or intermediate streams;
generating an output stream from the intermediate stream, wherein for each matched reserved pattern, the corresponding sequential input symbols are substituted in place of the corresponding intermediate sequential symbols from the intermediate stream; and
transmitting the output stream in a sequence of data records comprising respective headers and payloads.

2. The method according to claim 1, wherein the reserved pattern is reserved for use to distinguish the headers from the payloads.

3. The method according to claim 2, wherein only the payloads in the data records are encrypted, while the headers are unencrypted.

4. The method according to claim 1, wherein the cipher is applied with an output feedback (OFB) mode encryption to the input stream.

5. The method according to claim 1, wherein the cipher is applied with a cipher feedback (CFB) mode encryption to the input stream.

6. The method according to claim 5, wherein the reserved pattern comprises N symbols, and wherein the CFB mode encryption uses a feedback loop comprising a delay no less than N symbols in generating the intermediate stream.

7. The method according to claim 1, wherein the output stream contains a number of the output symbols that is equal to the number of the input symbols in the input stream.

8. Apparatus for data processing, comprising:
a processor;
an encryptor to be executed by the processor, said encryptor configured to apply a cipher to an input stream comprising sequential input symbols so as to generate an intermediate stream comprising sequential output symbols, each corresponding respectively to one of the input symbols, wherein:
said encryptor is also configured to compare a reserved pattern to the sequential input symbols and sequential output symbols in a sliding window of the given length in both the input and intermediate streams, wherein the reserved pattern is matched in the sliding window if for each of the symbols of the reserved pattern there is a match with a corresponding sequential symbol in at least one of the input and/or intermediate streams, and
said encryptor is also configured to generate an output stream from the intermediate stream, wherein for each matched reserved pattern, the corresponding sequential input symbols are substituted in place of the corresponding intermediate sequential symbols from the intermediate stream; and
a transmitter operative to transmit the output stream in a sequence of data records comprising respective headers and payloads.

9. The apparatus according to claim 8, wherein the reserved pattern is reserved for use to distinguish the headers from the payloads.

10. The apparatus according to claim 9, and comprising a demultiplexer, which is coupled to separate the headers from the payloads, so that only the payloads in the data records are encrypted by the encryption module, while the headers are unencrypted.

11. The apparatus according to claim 8, wherein the encryptor is configured to apply an output feedback (OFB) mode cipher to the input stream.

12. The apparatus according to claim 8, wherein the encryptor is configured to apply a cipher feedback (CFB) mode cipher to the input stream.

13. The apparatus according to claim 12, wherein the reserved pattern comprises N symbols, and wherein the CFB mode cipher uses a feedback loop comprising a delay no less than N symbols in generating the intermediate stream.

14. The apparatus according to claim 8, wherein the output stream contains a number of the output symbols that is equal to the number of the input symbols in the input stream.

15. A computer software product, comprising a non-transitory computer-readable medium in which program instructions are stored, wherein the program instructions, when read by a computer, cause the computer:
to receive a definition of a reserved pattern of symbols having a given length,
to receive an input stream comprising sequential input symbols,
to generate an intermediate stream of intermediate sequential symbols by applying a cypher to the input stream in the crypto-module, wherein each sequential symbol of the intermediate stream corresponds respectively to one of the sequential input symbols, to compare the reserved pattern to the sequential input symbols and intermediate sequential symbols in a sliding window of the given length in both the input and intermediate streams, wherein the reserved pattern is matched in the sliding window if for each of the symbols of the reserved pattern there is a match with a corresponding sequential symbol in at least one of the input or intermediate streams, to generate an output stream from the intermediate stream, wherein for each matched reserved pattern, the corresponding sequential input symbols are substituted in place of the corresponding intermediate sequential symbols from the intermediate stream; and to transmit the output stream in a sequence of data records comprising respective headers and payloads.

16. The product according to claim 15, wherein the reserved pattern is reserved for use to distinguish the headers from the payloads.

17. The product according to claim 16, wherein the instructions cause the computer to encrypt the input stream so that only the payloads in the data records are encrypted, while the headers are unencrypted.

18. The product according to claim 15, wherein the instructions cause the computer to apply an output feedback (OFB) mode cipher to the input stream.

19. The product according to claim 15, wherein the instructions cause the computer to apply a cipher feedback (CFB) mode cipher to the input stream.

20. The product according to claim 19, wherein the reserved pattern comprises N symbols, and wherein the CFB mode cipher uses a feedback loop comprising a delay no less than N symbols in generating the intermediate stream.

21. The product according to claim 15, wherein the output stream contains a number of the output symbols that is equal to the number of the input symbols in the input stream.

22. A system for data communication, comprising:
a receiver, which is coupled to receive from a network an encrypted input stream comprising sequential input symbols;
a client device comprising a decryptor configured to apply a cipher to the input stream comprising sequential input symbols so as to generate an intermediate stream comprising sequential output symbols, each corresponding respectively to one of the sequential input symbols, wherein:
said decryptor is also configured to compare a reserved pattern of symbols to sequential symbols in a sliding window of the given length in both the input and intermediate streams, wherein the reserved pattern is matched in the sliding window if for each symbol of the reserved pattern there is a match with the corresponding sequential symbol in at least one of the input and/or intermediate streams, and
said decryptor is also configured to generate a decrypted output stream from the intermediate stream, wherein for each matched reserved pattern, the corresponding sequential input symbols are substituted in place of the corresponding sequential output symbols from the intermediate stream; and
a transmitter operative to transmit the output stream in a sequence of data records comprising respective headers and payloads.

* * * * *

UNITED STATES PATENT AND TRADEMARK OFFICE
CERTIFICATE OF CORRECTION

PATENT NO. : 9,031,227 B2
APPLICATION NO. : 13/380965
DATED : May 12, 2015
INVENTOR(S) : Belenky et al.

Page 1 of 1

It is certified that error appears in the above-identified patent and that said Letters Patent is hereby corrected as shown below:

In the Specification

In column 7, line 45, delete "$\{p_1, s_i\}$" and substitute therefor -- $\{p_1, s_1\}$ --.

Signed and Sealed this
Twenty-fourth Day of May, 2016

Michelle K. Lee
*Director of the United States Patent and Trademark Office*